United States Patent
Parts et al.

(10) Patent No.: US 7,865,201 B2
(45) Date of Patent: Jan. 4, 2011

(54) HARQ DATA RECEPTION IN MULTIRADIO DEVICE

(75) Inventors: Ülo Parts, Helsinki (FI); Sami Haapoja, Helsinki (FI); Seppo Kangasmaa, Helsinki (FI); Niko Kiukkonen, Veikkola (FI)

(73) Assignee: Nokia Corporation, Espoo (FI)

( * ) Notice: Subject to any disclaimer, the term of this patent is extended or adjusted under 35 U.S.C. 154(b) by 734 days.

(21) Appl. No.: 11/806,425

(22) Filed: May 31, 2007

(65) Prior Publication Data

US 2008/0107054 A1    May 8, 2008

(30) Foreign Application Priority Data

Nov. 6, 2006  (FI) .................................. 20065699

(51) Int. Cl.
*H04B 15/00* (2006.01)
(52) U.S. Cl. ................. 455/501; 455/67.11; 455/67.13; 375/148
(58) Field of Classification Search .............. 455/67.13, 455/501; 370/329, 310; 375/341, 148
See application file for complete search history.

(56) References Cited

U.S. PATENT DOCUMENTS

| 7,623,879 | B2 * | 11/2009 | Honkanen et al. ............ 455/501 |
| 2004/0157595 | A1 * | 8/2004 | Kruger ........................ 455/423 |
| 2006/0034399 | A1 * | 2/2006 | Murao ......................... 375/341 |
| 2006/0135076 | A1 * | 6/2006 | Honkanen et al. ......... 455/67.13 |
| 2006/0165032 | A1 | 7/2006 | Hamalainen et al. |
| 2006/0215603 | A1 * | 9/2006 | Nishio et al. ................. 370/329 |
| 2007/0133461 | A1 * | 6/2007 | Lenzini et al. .............. 370/329 |
| 2007/0201538 | A1 * | 8/2007 | Wang et al. .................. 375/148 |

FOREIGN PATENT DOCUMENTS

| EP | 0 917 321 A1 | 5/1999 |
| EP | 1 583 270 A1 | 10/2005 |
| WO | WO 2004/060001 A1 | 7/2004 |
| WO | WO 2004/110088 A1 | 12/2004 |
| WO | WO 2006/053951 A1 | 5/2006 |
| WO | WO 2006053951 | * 5/2006 |

OTHER PUBLICATIONS

International Search Report, PCT/FI2007/050592, filed Nov. 5, 2007.

* cited by examiner

*Primary Examiner*—Edward Urban
*Assistant Examiner*—Golam Sorowar
(74) *Attorney, Agent, or Firm*—Squire, Sanders & Dempsey LLP

(57) ABSTRACT

A HARQ data reception scheme for a multiradio communication device is disclosed. The communication device operates multiple radio connections and monitors interference level caused to a target radio connection by at least one other radio connection operated in the communication device. A data packet and at least one retransmission data packet are received with the target radio connection. The utilization of the received data packet and the at least one received retransmission data packet in a hybrid automatic repeat request data reception is determined according to the interference level at the time instant associated with the reception of the corresponding data packet. Under high interference, the received data packet may be discarded, and detected and decoded data packets may be weighted for the HARQ combining according to the interference levels associated with the data packets.

24 Claims, 3 Drawing Sheets

HARQ DATA RECEPTION IN MULTIRADIO DEVICE

FIELD

The invention relates to data reception in a communication device operating multiple radio connections.

BACKGROUND

The number of different radios in a mobile communication device is steadily increasing to facilitate more flexible connectivity and a broader range of services. Cellular access alone is no longer sufficient, but new wireless technologies are integrated into communication devices now and especially in the future to enable novel connectivity solutions. Integration of multiple radios into a single terminal, however, introduces a serious integration challenge that is becoming more pronounced as the number of radios increases. One element of the integration challenge is the appropriate handling of simultaneous operation of radios. It is quite evident that users are willing to use different radios at the same time, like using a headset employing wireless Bluetooth® technology during a GSM phone call, and using a wireless local area network (WLAN) connection for Internet browsing, for example.

If there are two or more operational radio connections from one communication device, the connections may very well interfere with one another. Even if the connections are not operating on the same frequency band, they may still interfere with each other due to the non-idealities in the components' of the communication device. The components may introduce spectral leakage, and the selectivity of receivers may not be ideal, meaning that they may also receive signal components belonging to a signal other than the desired one.

Mobile telecommunication systems have adopted a hybrid automatic repeat request (HARQ) scheme for packet radio services in order to enable reliable and fast transfer of data packets. Mobile telecommunication systems employing the HARQ scheme include Wimax, high-speed packet access (HSPA) of Universal Mobile telecommunication System (UMTS) based on wideband code division multiple access (W-CDMA), and a Fast Low-latency Access with Seamless Handoff Orthogonal Frequency Division Multiple Access (FLASH-OFDM). Many of upcoming wireless telecommunication systems will be utilizing HARQ, too.

In a multiradio communication device, the level of the interference caused by one connection to another may be significantly high due to the close proximity of transmitters and receivers. Accordingly, a problem with the conventional HARQ is that a data packet received under a strong interference will be detected and decoded. Probably, the decoding of the data packet was not successful and, thus, the decoded data contains errors. The information obtained from the data packet will then be stored and combined later with retransmissions of the same data packet in order to decode the payload information correctly. Accordingly, the data packet received under the strong interference and containing a significant amount of errors may hinder data detection in the combining stage considerably.

BRIEF DESCRIPTION OF THE INVENTION

An object of the invention is to provide an improved solution for hybrid automatic repeat request data reception in a communication device.

According to an aspect of the invention, there is provided a method. The method comprises monitoring interference level caused to a target radio connection by at least one other radio connection, the radio connections being operated in the same communication device, receiving a data packet and at least one retransmission data packet with the target radio connection, and determining the utilization of the received data packet and the at least one received retransmission data packet in a hybrid automatic repeat request data reception according to the interference level at the time instant associated with the reception of the corresponding data packet.

According to another aspect of the invention, there is provided an apparatus. The apparatus comprises an interface configured to receive a data packet and at least one retransmission data packet, and a processing unit. The processing unit is configured to monitor interference level caused to a target radio connection by at least one other radio connection, the radio connections being operated in the same communication device comprising the apparatus, and determine the utilization of the received data packet and the at least one received retransmission data packet in a hybrid automatic repeat request data reception according to the interference level at the time instant associated with the reception of the corresponding data packet.

According to another aspect of the invention, there is provided a radio communication device comprising the above-mentioned apparatus.

According to yet another aspect of the invention, there is provided a computer program product encoding a computer program of instructions for executing a computer process for carrying out the above-mentioned method.

According to yet another aspect of the invention, there is provided a computer program distribution medium readable by a computer and encoding a computer program of instructions for executing a computer process for carrying out the above-mentioned method.

LIST OF DRAWINGS

In the following, the invention will be described in greater detail with reference to the embodiments and the accompanying drawings, in which FIG. 1 illustrates a block diagram of a communication device according to an embodiment of the invention operating multiple radio connections;

DESCRIPTION OF EMBODIMENTS

Figure 1:
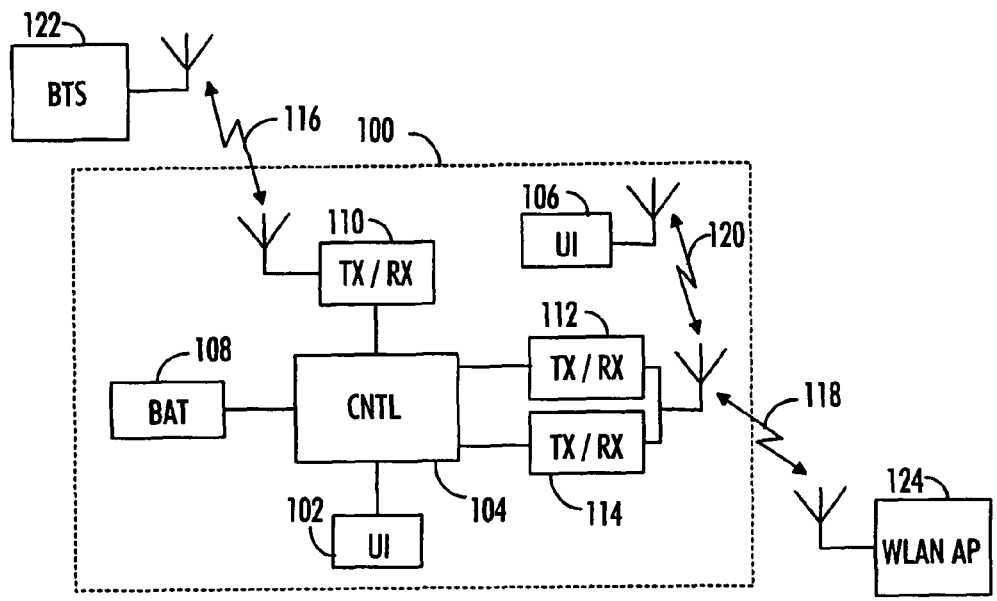

Next, a structure of a communication device employing a number of simultaneous radio connections will be described with reference to FIG. 1. The communication device 100 may be for example a mobile communication device, a computer, a laptop, or a PDA (Personal Digital Assistant). The communication device 100 may also be a combination of two electronic devices, such as a computer with a mobile communication device connected to the computer.

The communication device 100 comprises a number of communication interfaces 110 to 114 to provide wireless radio connections. The communication interfaces 110 to 114 may be configured to provide connections employing different radio access technologies. In our example, the communication interface 110 provides a communication link 116 with a mobile telecommunication network through a serving base transceiver station 122. The mobile telecommunication network may provide a high-speed packet radio service in its coverage area. The mobile telecommunication network may be based on wideband code division multiple access (W-CDMA) of orthogonal frequency division multiple access (OFDMA), for example. The communication interface 114 provides a WLAN (Wireless Local Area Network) connection 118 with a serving WLAN access point 124.

A communication interface 112 provides another wireless connection 120, using Bluetooth®-technology, with a user interface component 106. The user interface component 106 may be for example a headset of a mobile telephone, comprising a microphone, a loudspeaker, and a communication interface for a Bluetooth® connection with the mobile telephone. The user interface component 106 may also be a keyboard or a mouse operating with a computer through a Bluetooth® link.

The communication interfaces 110 to 114 described above may be using partially the same components of the communication device 100 during the operation of radio connections 116 to 120. The communication interfaces 110 to 114 may be using for example the same antenna or antennas, radio frequency amplifier, and/or radio frequency filter. Each communication interface 110 to 114 may naturally have its own components or only some of the communication interfaces 110 to 114 may be using the same components.

In the example of FIG. 1, three communication interfaces 110 to 114 are provided in the communication device 100, these interfaces 110 to 114 providing the Bluetooth® connection 120, the radio connection 116 to the base station 122, and the WLAN connection 118, respectively. It should, however, be appreciated that the communication device according to the invention is limited neither to the number of communication interfaces in the communication device nor to the wireless communication technology the communication interfaces 116 to 120 provide. Thus, the communication device 100 may comprise several communication interfaces providing connections based on, for example, the following technologies: GSM, WLAN, Bluetooth®, W-CDMA, OFDMA (or any other multicarrier radio access), GPRS (General Packet Radio Service), EDGE (Enhanced Data Rates for GSM Evolution), DVB-H (Digital Video Broadcasting for Handheld devices), UWB (Ultra Wideband), GPS (Global Positioning System), CDMA2000. Other wireless communication technologies are also possible to be implemented in the communication device according to the invention.

The communication device 100 further comprises a processing unit 104 to control functions of the device 100. The processing unit 104 comprises means for creating radio connections between the communication device 100 and other communication devices or networks. The processing unit 104 also comprises means for controlling a number of simultaneous radio connections in the communication device 100. The processing unit 104 may also comprise means for controlling data reception and decoding in the communication device 100. The processing unit 104 may be implemented with a digital signal processor with suitable software or with separate logic circuits, for example with ASIC (Application Specific Integrated Circuit). The processing unit 104 may also be a combination of these two implementations, such as a processor with suitable software embedded within an ASIC.

The communication device 100 may further comprise a user interface 102 connected to the processing unit 104. The user interface 102 may comprise a keyboard, a microphone, a loudspeaker, a display, and/or a camera.

The communication device 100 usually comprises a voltage source 108 to provide current for the operation of the device 100. The voltage source 108 may be for example a rechargeable battery.

Figure 2:
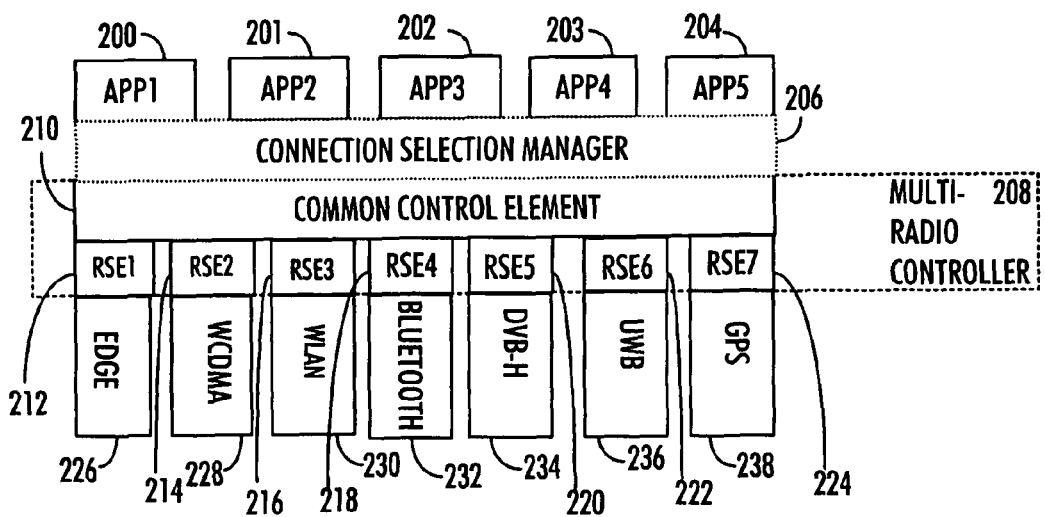
FIG. 2 is a layered diagram of the communication device according to an embodiment of the invention.

FIG. 2 illustrates an example of an architecture of the communication device 100. The architecture is depicted in a layered form with lower layers providing services to higher layers.

On the highest layer are provided applications 200 to 204 that may need a radio connection. The application 200 to 204 may be for example an application handling a voice call, a web or WAP (Wireless Application Protocol) browser, an e-mail client, a GPS navigation application, a gaming application, or a media player application. Whenever an application 200 to 204 needs a radio connection to another communication device or network, the application sends a request to a lower layer to establish the connection. During the operation of the connection, the application sends data related to the application to lower layers for transmission over the connection to the other communication device. Similarly, the application receives data related to the application from the other communication device via the connection through the lower layers. When a need no longer exists to maintain the connection, the application sends a request to a lower layer to terminate the connection.

On the lower layer, services may be provided to the applications 200 to 204 by a connection selection manager 206. The connection selection manager 206 may select an appropriate connection for an application based on a set of connection profiles stored in its database. A user or an operator, for example, may define the connection profiles, and the profiles may be based on optimization of some criterion, for example throughput, bit error rate or cost-efficiency of the connection. The connection selection manager 206 is an optional layer in the architecture of the communication device 100, since the applications 200 to 204 may be designed to define the suitable connections by themselves.

The next lower layer is a multiradio controller 208. The multiradio controller 208 establishes, controls, and terminates radio connections according to the connection requirements from the higher layers. The multiradio controller 208 is also responsible for taking care of the simultaneous operation of multiple radio connections. The concept of the multiradio controller is known from the applicant's US patent application US 2006135076 which has been incorporated herein as a reference.

The multiradio controller 208 may be a two-fold entity. First of all, there is a common control element 210, which communicates with the higher layers. It receives requests for creating and terminating a radio connection from the applications 200 to 204 or, if applied, the connection selection manager 206. The common control element 210 may also check the availability of the radio connection requested from a higher layer, and either start a process for creating a radio connection or inform higher layers that the requested radio connection is not currently available. The common control element 210 is also responsible for controlling the simultaneous operation of multiple radio connections by adjusting the parameters of an existing connection whenever a new radio connection which would interfere with an existing radio connection is created, or whenever the common control element 210 detects a sufficient change in the properties of an existing connection.

The multiradio controller 208 also comprises radio-specific entities 212 to 224. Each radio-specific entity can be seen as an interface between the common control element 210 of the multiradio controller 208 and the specific radio interface. A radio-specific entity takes care of controlling one radio connection according to the parameters received from the common control element 210. A radio-specific entity is close to the physical layer of the connection, which enables rapid adaptation to the changing environment and fast control of the connection. The functionality of each radio-specific entity is radio-system-specific, which means that the parameters from the common control element 210 are applied to the standard specifications of the radio system. A radio-specific entity may also supply the common control element 210 with the measured properties of the connection it controls. The measured properties of the connection may comprise the bit error rate (BER), block error rate, or the frame error rate (FER) of the connection. The measured properties may also comprise received energy per chip divided by the noise power density in the band (Ec/No), interference signal code power (ISCP), received signal code power (RSCP), received signal strength indicator (RSSI), signal-to-interference-power ratio (SIR), and carrier-to-interference-power ratio (C/I).

Below the radio-specific entities 212 to 224 in FIG. 2 are provided the communication interfaces 226 to 238. Each communication interface takes care of encoding and decoding data into suitable electrical waveforms for transmission and reception on the specific physical media used. This process is carried out according to each radio-access-specific standard. The architecture of FIG. 2 employs physical layers of EDGE, W-CDMA, WLAN, Bluetooth®, DVB-H, UWB and GPS radio access technologies, but the operation of the multiradio controller is not limited to these technologies as it can be configured to control also other wireless radio access technologies.

The multiradio controller 208 according to an embodiment of the invention monitors interference levels between active radio connections operated by the multiradio controller 208. Accordingly, the multiradio controller 208 monitors self-interference affecting the reception quality of a given radio connection. The self-interference to the given radio connection is caused by other active radio connections in the communication device 100. For example, transmission with one radio connection may deteriorate the reception with another radio connection, if the two connections share the same radio resources, i.e. use the same frequency band at the same time. The multiradio controller 208 may deduce the self-interference levels from the transmission parameters of the active radio connections. An active radio connection refers to that a radio connection has been established between the communication device 100 and another radio transceiver, for example one of transceivers 122, 106, 124 illustrated in FIG. 1.

Figure 3:
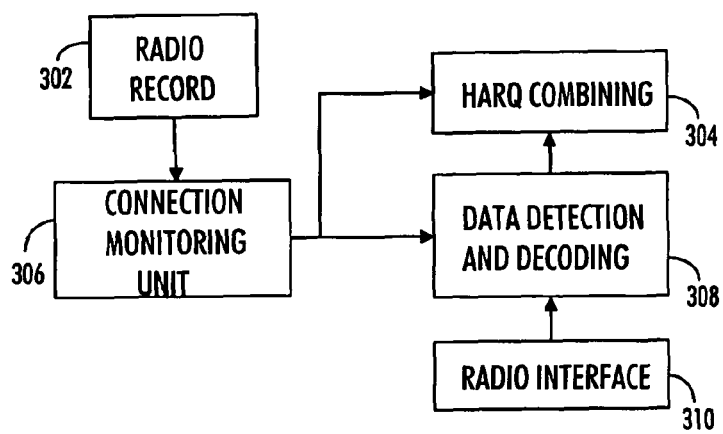
FIG. 3 illustrates a block diagram of units related to data reception in the communication device according to an embodiment of the invention.

Let us now focus on a radio connection operated by the multiradio controller 208. The target radio connection utilizes packet radio transmission utilizing a hybrid automatic repeat request (HARQ) scheme according to an embodiment of the invention. FIG. 3 is a block diagram illustrating components of the communication device 100 affecting reception and processing of data packets received with the target radio connection.

A radio record 302 stores parameters of every radio connection active in the communication device 100, i.e. being controlled by the multiradio controller 208. Accordingly, the radio record 302 stores information on transmission parameters of the active radio connections. The stored parameters of a given radio connection may include transmission frequency, transmit power, transmission timing, data rate, isolation properties with the other radio connection, information on non-idealities causing interference to other radio connections, such as spectral leakage, level of harmonic components of a transmission signal etc.

A connection monitoring unit 306 monitors the self-interference level caused to the active target radio connection by at least one other active radio connection. The connection monitoring unit 306 may constantly monitor the transmission parameters of the target radio connection and the other active radio connection and determine the self-interference level from the transmission parameters. The connection monitoring unit 306 may calculate, for example, a carrier-to-interference-power ratio (C/I) from the transmission parameters to measure the interference level. Other metrics for determining the interference level are also possible. The metric may be one of the measured properties of a monitored connection listed above.

Accordingly, the connection monitoring unit 306 does not have to estimate the interference level from a received signal, which simplifies the determination of the interference level. On the contrary, conflicting radio connections may be identified in a development or production phase of the communication device 100, and corresponding parameter may be stored in the radio record 302. For example, if it is known that the target packet radio connection will have conflicts with another radio connection with given transmission parameters, these transmission parameters causing the conflict may be stored in the radio record 302. Alternatively, the communication device 100 may be calibrated according to the test results obtained from a field-testing of the communication device 100. In other words, the communication device 100 may be tested in a real environment, the interference levels between the radio connections may be measured and transmission parameters causing interference may be detected and stored in the radio record 302 of the communication device 100.

For instance, if the two radio connections operate temporarily on the same frequency band and the other radio connection is transmitting with a given (or higher) transmit power, that radio connection will deteriorate the data reception in the target packet radio connection. The connection monitoring unit 306 may immediately detect the occurrence of the conflicting transmission parameters and control data reception of the target packet radio connection accordingly. The data reception under the control of the connection monitoring unit 306 is described below.

A data packet belonging to a given HARQ process may be received over the target radio connection through a radio interface 310. The connection monitoring unit 306 may determine the interference level at the time of reception of the data packet. If the interference level associated with the received data packet exceeds a predetermined threshold level, the connection monitoring unit 306 may determine that the data in the received data packet should not be detected and decoded. Accordingly, the received data packet is then discarded, and a negative acknowledgment (NACK) signal may be transmitted to a transmitter of the data packet. Alternatively, no signal may be transmitted instead of transmitting the NACK-signal. If the interference level associated with the received data packet exceeds the threshold level, the received data packet is considered to be corrupted with so much interference that data detection and decoding will not be worth while, since the decoded data would include too many errors. Therefore, it would be appropriate to discard the data packet in order to save power and avoid unnecessary calculations in the data detection and decoding.

The threshold may be selected according to a given criterion. For example, a given bit or symbol error probability boundary may be determined for defining when it is advantageous to detect and decode the received data. With a higher error probability, the detection and decoding is no more advantageous. A given interference level causing the determined bit or symbol error probability may then be calculated and used as the threshold level. The above-described way to define the threshold is merely exemplary, and the threshold may be determined in any other way.

On the other hand, if the interference power level associated with the received data packet is below the threshold level, the connection monitoring unit 306 may give a data detection and decoding unit 308 a command to detect and decode the data in the received data packet. Additionally, the data detection and decoding unit 308 may check whether the decoded data comprises errors. This may be performed with a cyclic redundancy check (CRC), for example. If the decoded data includes errors, the decoded data may be stored as soft values, i.e. as symbol or bit probabilities, and a NACK-signal may be transmitted to the transmitter in order to receive a retransmission of the same data packet. The interference level associated with the data packet may also be stored for later use.

When the retransmission data packet belonging to the same HARQ process is received, the connection monitoring unit 306 may again determine the interference level at the time of reception of the retransmission data packet. If the interference level exceeds the threshold level, the retransmission data packet is discarded. If the interference level is below the threshold level, the connection monitoring unit 306 instructs the data detection and decoding unit 308 to detect and decode the data in the received retransmission data packet.

When two transmissions of the data packet belonging to the above-mentioned HARQ process have been detected and decoded, the decoded soft data may be combined in the HARQ combining unit 304. According to an embodiment of the invention, the connection monitoring unit 306 may weight the decoded soft data obtained from the received data packets according to the interference levels associated with the corresponding data packets. The connection monitoring unit 306 may assign the weight to a data packet inversely proportionally to the interference level associated with the data packet. Accordingly, soft data obtained from a data packet associated with a higher interference level is assigned with a lower weight than soft data obtained from a data packet associated with a lower interference level. The connection monitoring unit 306 may give the corresponding weights to the HARQ combining unit 304. Then, the HARQ combining unit 304 combines the bit/symbol probabilities of the received data by applying the assigned weighting, and makes hard bit/symbol decisions and another CRC. If the CRC indicates that the combined data still comprises errors, another retransmission is needed. The same above-mentioned procedure is carried out with respect to additional retransmissions. If the CRC indicates that the combined data contains no errors, the HARQ process has been completed and the data has been decoded correctly.

In general, the connection monitoring unit 306 selects received data packets for detection, decoding, and HARQ combining on the basis of the interference level associated with each received data packet. One skilled in the art knows the conventional HARQ procedure and, thus, it will not be described here in greater detail. HARQ processing according to embodiments of the invention may be applied to both chase combining and incremental redundancy HARQ processing. In chase combining, retransmission data packets have the same content as an initially transmitted data packet. In incremental redundancy, the retransmission may include additional information, such as additional parity bits, which were not transmitted in the initial transmission.

In the procedure described above, the whole data packet will be discarded, if the interference level associated with the data packet exceeds the threshold level. That procedure is suitable for single carrier packet radio reception. Another embodiment of the invention relates to multicarrier data reception utilized in a target packet radio connection. When a data packet is received on a plurality of subcarriers, the connection monitoring unit 306 may associate each subcarrier with a given interference level. The interference level for each subcarrier may be obtained from the transmission parameters of the target radio connection and other active radio connections, as described above. Instead of processing each subcarrier separately, the subcarriers may be grouped and each group may be associated with a given interference level. If a given subcarrier (or subcarrier group) is associated with an interference level exceeding a predetermined threshold level (may be the above-mentioned threshold level or another threshold level), the subcarrier (group) is discarded, i.e. no data detection and decoding will be carried out on the subcarrier (group). Accordingly, the connection monitoring unit 306 may instruct the data detection and decoding unit 308 accordingly. On the other hand, if the interference level associated with the subcarrier (group) is below the threshold level, the data in the subcarrier (group) will be decoded and detected by the detection and decoding unit 308. The data detection and decoding unit 308 may derive the values of the symbols in the discarded subcarriers from the symbols of decoded subcarriers, or the HARQ combining unit 304 may obtain the missing information from retransmission data packets.

When combining the decoded soft data of different transmissions of the same HARQ process in the HARQ combining unit 304, similar weighting as described above may be used. The connection monitoring unit 306 may weight the soft data obtained from the subcarriers inversely proportionally to the interference levels associated with the corresponding subcarriers. Accordingly, soft data obtained from a subcarrier (group) associated with a higher interference level is assigned with a lower weight than soft data obtained from a subcarrier (group) associated with a lower interference level. The connection monitoring unit 306 may give the corresponding weights to the HARQ combining unit 304. Then, the HARQ combining unit 304 combines the bit/symbol probabilities of the received data by applying the assigned weighting, and makes hard bit/symbol decisions and a CRC. If the combined data still comprises errors, another retransmission is needed. The same procedure is carried out with respect to additional retransmissions. If the combined data contains no errors, the HARQ process has been completed and the data has been decoded correctly.

According to an embodiment of the invention, the multiradio controller 208 may adjust transmission parameters of at least one active radio connection upon detection of interference level exceeding the predetermined threshold. In other words, if the connection monitoring unit 306, which may be part of the multiradio controller 208, detects an interference level causing discard of data packets, the connection monitoring unit 306 may inform the radio connection management section of the multiradio controller of the increased interference level affecting the target radio connection. As a response, the radio connection management section may adjust transmission parameters of the target radio connection and/or an interfering radio connection (or connections) in order to reduce the interference level.

Figure 4:
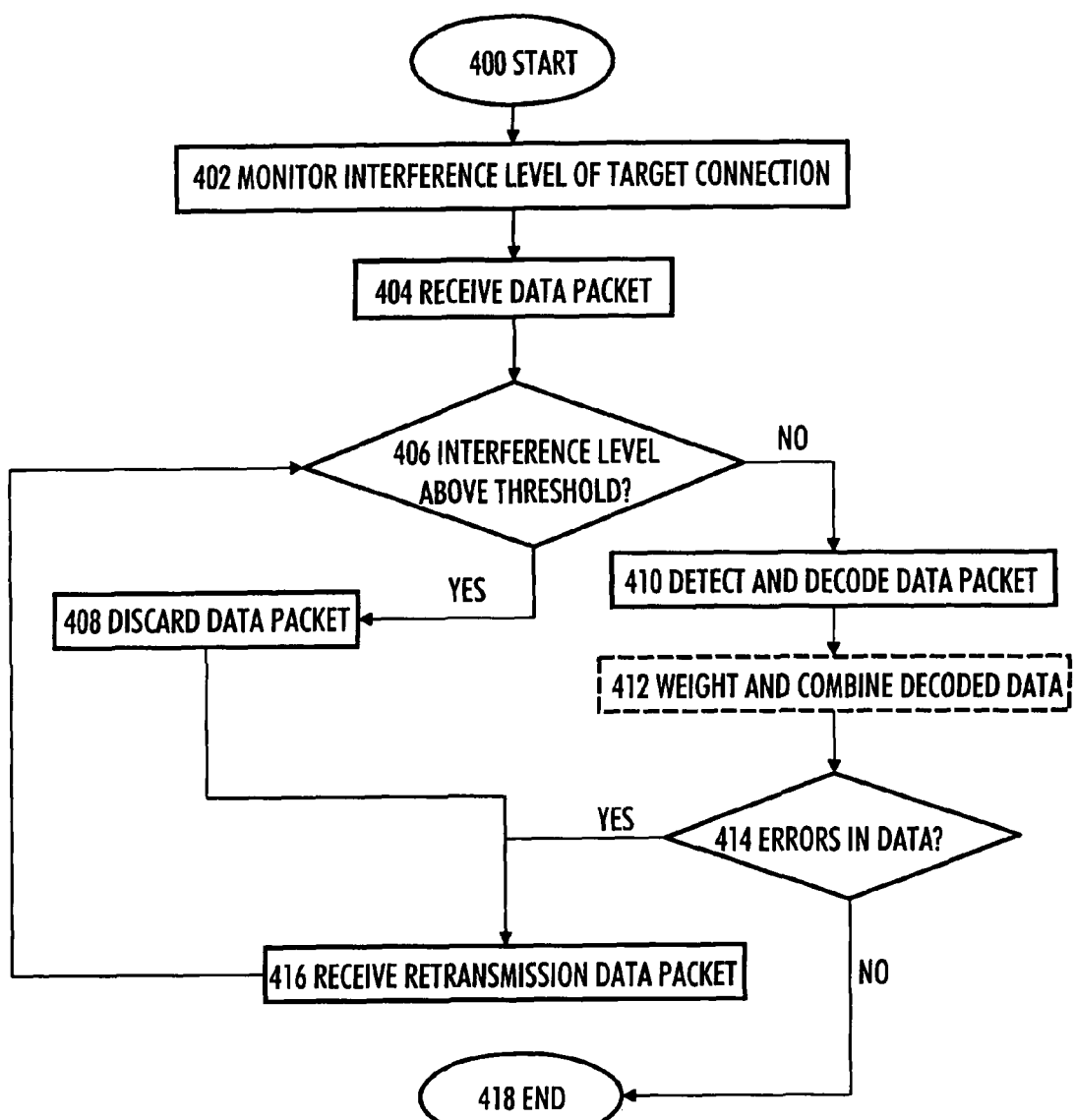
FIG. 4 is a flow diagram illustrating a hybrid automatic repeat request data reception procedure according to an embodiment of the invention.

Next, a process for packet radio reception according to an embodiment of the invention will be described with reference to a flow diagram in FIG. 4. The process starts in block 400. In block 402, interference level associated with a target radio connection being active in the communication device 100 according to an embodiment of the invention is being monitored. The monitoring may be continuous, meaning that the monitoring may be performed while carrying out other operations, i.e. while processing other blocks of FIG. 4. The level of interference caused to the target radio connection by other radio connections active in the communication device 100 may be monitored by monitoring transmission parameters of both the target radio connection and the interfering radio connections and determining the interference level from the transmission parameters.

In block 404, a data packet belonging to a given HARQ process is received. The data packet may be an initial transmission of the HARQ process. In block 406, the level of interference affecting the target radio connection at the time the data packet was received is compared with a predetermined threshold level. If the interference level exceeds the threshold level, the process moves to block 408 in which the data packet is discarded. If the interference level is below the threshold level in block 406, the process moves to block 410 in which data in the data packet is detected and decoded.

If the data packet is the first data packet of the HARQ process that was detected and decoded, block 412 will not be carried out at this stage. Instead, the process moves directly to block 414 in which it is checked whether the decoded data contains errors, i.e. whether or not the data packet was decoded correctly. This may be performed with CRC, for example. If the decoded data contains no errors, the process moves to block 418 in which the HARQ process ends. On the other hand, if the decoded data contains errors, the process moves from block 414 to block 416 in which a retransmission data packet is received. If the data packet was discarded in block 408, the process moves from block 408 to block 416, too. The retransmission data packet may contain the same data as the previously received data packet (chase combining) or additional information facilitating the correct decoding of the previously received data packet (incremental redundancy).

From block 416, the process returns to block 406 in which the interference level at the time the retransmission data packet was received is compared with the threshold level, and it is determined whether the retransmission data packet should be discarded or detected and decoded.

If block 410 has been carried out at least two times in the HARQ process, block 412 is carried out. In block 412, decoded data of each received data packet (initial and retransmissions) is weighted according to the interference level associated with the corresponding data packet in block 406. Decoded data of a data packet associated with a high interference level is weighted less than decoded data of a data packet associated with a low interference level. Thus, more weight is assigned to the data which is assumed to be decoded more reliably. After block 410, the decoded data is in the form of bit or symbol probabilities, i.e. in soft values. In block 412, the decoded data of the received data packets is combined according to the assigned weights. For example, if a given symbol is included in at least two data packets, the symbol value will be determined by taking into account the soft symbol values obtained from each data packet for the particular symbol and corresponding weights of the soft symbol values.

For example, let us assume that possible symbol values are 1 and −1. A soft symbol value obtained from a data packet assigned with a low weight has value 0.4 indicating that the symbol value is more probably 1, while a soft symbol value obtained from a data packet assigned with a high weight has value −0.2 indicating that the symbol value is more probably −1. Now, −1 may be selected as the combined symbol value even though the soft symbol value having the lower weight indicates a higher probability for the symbol value being 1 (0.4 vs. 0.2). The combined symbol value selection depends on the assigned weights, and 1 could be selected as the symbol value, if the weights were very close to each other.

HARQ-combined data is obtained as a result of carrying out block 412. Thereafter, the HARQ-combined data is checked for errors in block 414.

Figure 5:
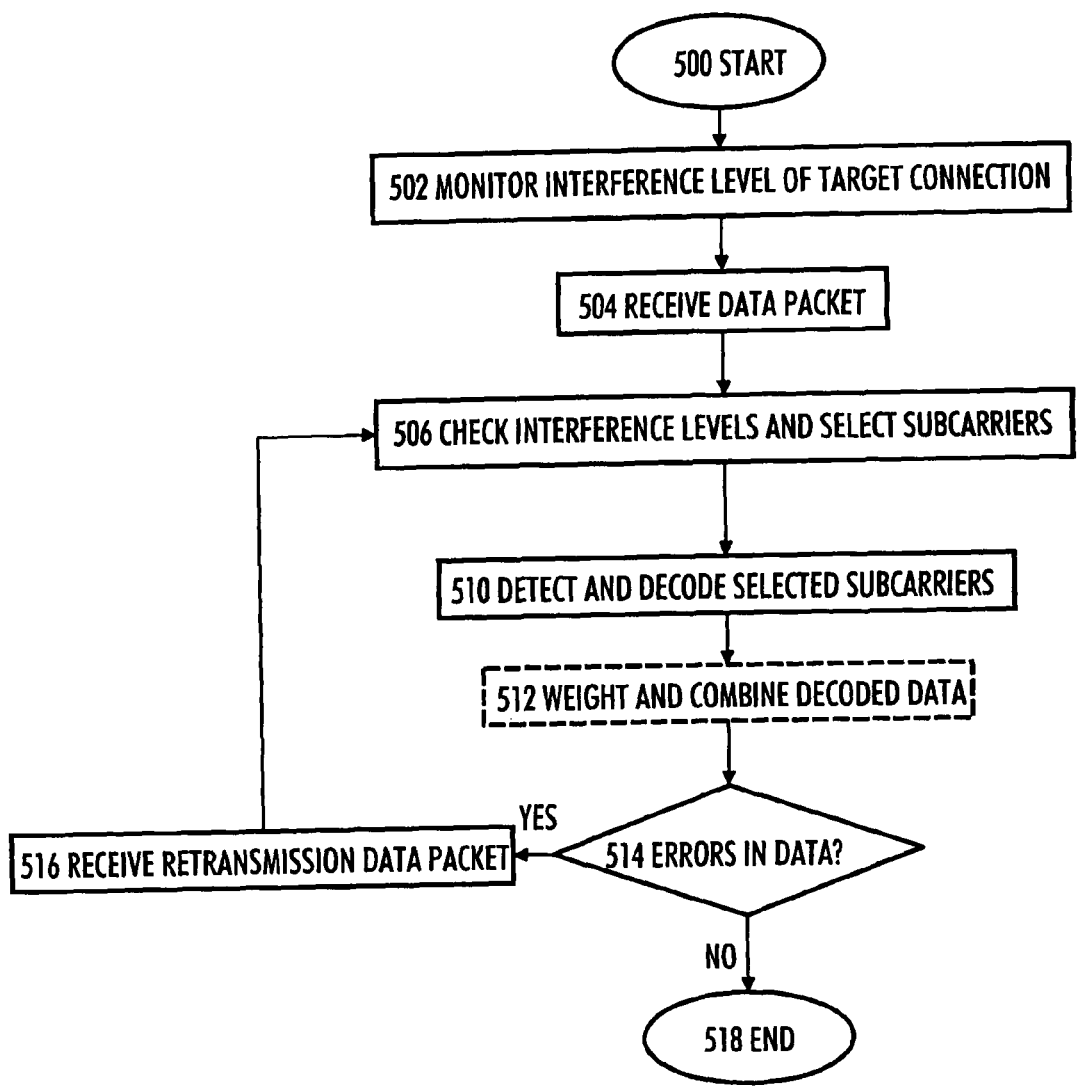
FIG. 5 is a flow diagram illustrating a hybrid automatic repeat request data reception procedure according to another embodiment of the invention.

FIG. 5 illustrates a process for receiving data packets belonging to a HARQ process, in which process the data packets are received on a multicarrier radio signal comprising a plurality of subcarriers. The process is similar to that described with reference to FIG. 4 but now the decision of whether to discard or detect and decode data is performed on subcarrier level instead of data packet level. The process starts in block 500.

In block 502, an interference level of the target connection is monitored. The monitoring may be divided into frequency sub-bands of the band-width occupied by the target radio connection. Accordingly, the interference level of each frequency sub-band may be monitored. The number of frequency sub-bands may be equal to the number of the subcarriers used in the transmission of the data packets, or a number of subcarriers may be grouped and the number of frequency sub-bands may be equal to the number of subcarrier groups.

In block 504, a data packet is received on the plurality of subcarriers. The data packet may be the initial transmission of the HARQ process under study. In block 506, the interference level associated with each subcarrier (or subcarrier group) is compared with a predetermined threshold level. The interference levels are obtained at the time the data packet was received. If the interference level associated with a given subcarrier (or subcarrier group) exceeds the threshold level, the subcarrier(s) are discarded, i.e. they will not be detected and decoded. On the other hand, if the interference level associated with the subcarrier (or subcarrier group) exceeds the threshold level, the subcarrier(s) is (are) selected for detection and decoding. The detection and decoding of the selected subcarriers is carried out in block 510.

If the data packet is the first data packet of the HARQ process that was detected and decoded, block 512 will not be carried out at this stage. Instead, the process moves directly to block 514 in which it is checked whether the decoded data contains errors, i.e. whether or not the data packet was decoded correctly. This may be performed with CRC, for example. If the decoded data contains no errors, the process moves to block 518 in which the HARQ process ends. On the other hand, if the decoded data contains errors, the process moves from block 514 to block 516 in which a retransmission data packet is received. From block 516, the process returns to block 506 in which the interference levels associated with the subcarriers (or subcarrier groups) of the retransmission data packet are compared with the threshold level. Accordingly, subcarriers of the retransmission data packet are selected for detection and decoding.

If block 510 has been carried out at least two times in the HARQ process, block 512 is carried out. In block 512, data decoded from the subcarriers of each received data packet (initial and retransmissions) is weighted according to the interference level associated with the corresponding data packet in block 406. Data decoded from subcarriers associated with a high interference level is weighted less than data decoded from subcarriers associated with a low interference level. Thus, more weight is assigned to the data which is assumed to be decoded more reliably. After block 510, the decoded data is in the form of bit or symbol probabilities, i.e. in soft values. In block 512, the decoded data of the received data packets is combined according to the assigned weights. Then, combined data is checked for errors in block 514.

The embodiments of the invention may be realized in a radio communication device, comprising a user interface, a plurality of communication interfaces, and a processing unit. The processing unit may be configured to perform at least some of the steps described in connection with the flowcharts of FIGS. 4 and 5 and in connection with FIGS. 2 and 3. The embodiments may be implemented as a computer program comprising instructions for executing a computer process for data packet reception and processing according to embodiments of the invention.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
 monitoring interference level caused to a target radio connection by at least one other radio connection, the target radio connection and the at least one other radio connection being operated in the same communication device;
 receiving a data packet and at least one retransmission data packet with the target radio connection; and
 determining a utilization of the received data packet and the at least one received retransmission data packet according to the interference level at a time instant associated with the reception of a corresponding data packet;
 discarding the received data packet before decoding the received data packet, if the interference level associated with the data packet indicates the interference level is higher than a predetermined threshold.

2. The method according to claim 1, further comprising:
 selecting data packets for detection and decoding according to interference levels associated with the data packets;
 detecting and decoding the selected data packets;
 assigning a weight to the decoded data of each decoded data packet according to the interference level associated with the corresponding data packet; and
 combining the decoded data of the data packets by using the weights assigned to the decoded data.

3. The method according to claim 2, further comprising:
 configuring the weight assigned to the data packet to be inversely proportional to the interference level associated with the data packet.

4. The method according to claim 1, wherein the interference level is obtained from transmission parameters of the target radio connection and the at least one other radio connection.

5. The method according to claim 4, wherein the transmission parameters of a given radio connection include at least one of the following transmission parameters: transmit frequency, transmit power level, isolation properties with the other radio connection, transmission time instants, and level of harmonic components of a transmission signal.

6. The method according to claim 1, wherein data packets are received on a plurality of subcarriers, the method further comprising:
 determining the interference level for each of the plurality of subcarriers, and
 discarding a subcarrier before data detection, if the interference level associated with the subcarrier is higher than a predetermined threshold.

7. The method according to claim 6, further comprising:
 selecting subcarriers for detection and decoding according to the interference levels associated with the subcarriers;
 detecting and decoding the selected subcarriers;
 assigning a weight to decoded data of each decoded subcarrier according to the interference level associated with the corresponding subcarrier; and
 combining the decoded data of the data packets according to the assigned weighting of the decoded data.

8. The method according to claim 1, wherein the method is carried out in a communication device operating a plurality of radio connections, the method further comprising:
 adjusting transmission parameters of at least one radio connection operated in the communication device upon detection of the interference level exceeding a predetermined threshold.

9. The method of claim 1, wherein the received data packet and the at least one received retransmission data packet are received in a hybrid automatic repeat request data reception.

10. The method according to claim 9, wherein the received data packet and the at least one retransmission data packet belong to the same hybrid automatic repeat request data reception.

11. An apparatus, comprising:
 an interface configured to receive a data packet and at least one retransmission data packet;
 a processing unit configured to monitor interference level caused to a target radio connection by at least one other radio connection, the target radio connection and the at least one other radio connection being operated in the same communication device comprising the apparatus, and determine a utilization of the received data packet and the at least one received retransmission data packet according to the interference level at a time instant associated with the reception of a corresponding data packet at a time instant associated with the reception of a corresponding data packet,
 the processing unit is further configured to discard the data packet before decoding the received data packet, if the interference level associated with the data packet indicates the interference level is higher than a predetermined threshold.

12. The apparatus according to claim 11, wherein the processing unit is further configured to select data packets for detection and decoding according to interference levels associated with the data packets, detect and decode the selected data packets, assign a weight to the decoded data of each decoded data packet according to the interference metric associated with the corresponding data packet, and combining the decoded data of the data packets according to the assigned weighting of the decoded data.

13. The apparatus according to claim 12, wherein the processing unit is further configured to assign the weight to the data packet inversely proportionally to the interference level associated with the data packet.

14. The apparatus according to claim 11, the interference level is obtained from transmission parameters of the target radio connection and the at least one other radio connection.

15. The apparatus according to claim 14, wherein the transmission parameters of a given radio connection include at least one of the following transmission parameters: transmit frequency, transmit power level, isolation properties with the other radio connections, transmission time instants, and level of harmonic components of a transmission signal.

16. The apparatus according to claim 11, wherein the interface is configured to receive data packets on a plurality of subcarriers, and the processing unit is further configured to determine the interference level for each of the plurality of subcarriers and discard a subcarrier before data detection, if the interference level associated with the subcarrier is higher than a predetermined threshold.

17. The apparatus according to claim 16, wherein the processing unit is further configured to select subcarriers for detection and decoding according to the interference levels associated with the subcarriers, configured to detect and decode the selected subcarriers, configured to assign a weight to the decoded data of each decoded subcarrier according to the interference level associated with the corresponding subcarrier, and configured to combine the decoded data of the data packets according to the assigned weighting of the decoded data.

18. The apparatus according to claim 11, wherein the processing unit is further configured to adjust transmission parameters of at least one radio connection operated in the communication device upon detection of the interference level exceeding a predetermined threshold.

19. The apparatus of claim 11, wherein the received data packet and the at least one received retransmission data packet are received in a hybrid automatic repeat request data reception.

20. The apparatus according to claim 19, wherein the received data packet and the at least one retransmission data packet belong to the same hybrid automatic repeat request data reception.

21. An apparatus, comprising:
means for monitoring interference level caused to a target radio connection by at least one other radio connection, the target radio connection and the at least one other radio connection being operated in the same communication device;
means for receiving a data packet and at least one retransmission data packet with the target radio connection; and
means for determining a utilization of the received data packet and the at least one received retransmission data packet according to the interference level at a time instant associated with the reception of a corresponding data packet;
means for discarding the received data packet before decoding the received data packet, if the interference level associated with the data packet indicates the interference level is higher than a predetermined threshold.

22. A radio communication device, comprising:
an interface configured to receive a data packet and at least one retransmission data packet;
a processing unit configured to monitor interference level caused to a target radio connection by at least one other radio connection, the target radio connection and the at least one other radio connection being operated in the same communication device comprising the apparatus, and determine a utilization of the received data packet and the at least one received retransmission data packet according to the interference level at a time instant associated with the reception of a corresponding data packet at a time instant associated with the reception of a corresponding data packet,
the processing unit is further configured to discard the data packet before decoding the received data packet, if the interference level associated with the data packet indicates the interference level is higher than a predetermined threshold.

23. A non-transitory computer program distribution medium readable by a computer and encoding a computer program of instructions for executing a computer process, comprising:
monitoring interference level caused to a target radio connection by at least one other radio connection, the target radio connection and the at least one other radio connection being operated in the same communication device;
receiving a data packet and at least one retransmission data packet with the target radio connection; and
determining a utilization of the received data packet and the at least one received retransmission data packet according to the interference level at a time instant associated with the reception of a corresponding data packet;
discarding the received data packet before decoding the received data packet, if the interference level associated with the data packet indicates the interference level is higher than a predetermined threshold.

24. The computer program distribution medium according to claim 23, the distribution medium including at least one of the following media: a computer readable medium, a program storage medium, a record medium, a computer readable memory, a computer readable software distribution package, and a computer readable compressed software package.

* * * * *